United States Patent [19]
Fassbender

[11] Patent Number: 4,558,631
[45] Date of Patent: Dec. 17, 1985

[54] CONTROL SYSTEM FOR TWO HYDRAULIC POWER CYLINDERS SUPPLIED BY A PRESSURE PUMP VIA ONE BRANCH CONNECTION EACH

[75] Inventor: Rolf Fassbender, Mutlangen, Fed. Rep. of Germany

[73] Assignee: Zahnradfabrik Friedrichshafen, AG, Friedrichshafen, Fed. Rep. of Germany

[21] Appl. No.: 443,946

[22] Filed: Nov. 23, 1982

[30] Foreign Application Priority Data

Dec. 11, 1981 [DE] Fed. Rep. of Germany ....... 3149026

[51] Int. Cl.⁴ .......................... B62D 5/06; F15B 11/20
[52] U.S. Cl. ......................................... 91/516; 91/517; 91/518; 251/63
[58] Field of Search ................. 91/514, 516, 517, 518, 91/532; 60/384, 422; 180/132; 137/100; 251/63, 25

[56] References Cited

U.S. PATENT DOCUMENTS 2,363,179 11/1944 Harrington et al. ................. 91/516
2,892,311  6/1959 Van Gerpen .......................... 60/422
4,005,636  2/1977 Dunn ..................................... 91/516
4,070,857  1/1978 Wible .................................... 91/516

Primary Examiner—Robert E. Garrett
Assistant Examiner—Richard S. Meyer
Attorney, Agent, or Firm—Zalkind & Shuster

[57] ABSTRACT

Separate branch conduits extend from a common pump to two fluid power operated systems. One of the branch conduits supplies a relatively low volume of fluid through a pilot flow conduit to a steering control valve in one of the systems to adjust its operating pressure when the steering control valve is displaced from its neutral position. The other branch conduit delivers pressurized fluid directly to the steering control valve on a priority basis. A pressure regulating valve connected between the other branch conduit and the pilot flow conduit isolates the steering system from a higher pressure in the other fluid power operated system and adjusts the operating pressure in the steering system to meet steering load demands.

2 Claims, 5 Drawing Figures

CONTROL SYSTEM FOR TWO HYDRAULIC POWER CYLINDERS SUPPLIED BY A PRESSURE PUMP VIA ONE BRANCH CONNECTION EACH

BACKGROUND OF THE INVENTION

The present invention relates to a control system through which two fluid power operated systems are supplied by a common pressure pump through separate branch conduits.

Fluid control systems of the foregoing type are generally known as disclosed in U.S. Pat. No. 4,174,018. In such systems, one branch conduit from the pump is connected to a flow divider from which a relatively low pilot flow volume of fluid is conducted to the steering control valve of a fluid power steering system while another residual flow conduit from the flow divider conducts operating fluid to another control valve for a power operated cylinder associated, for example, with a hydraulic lifting system. In the neutral position of the steering control valve, the pilot flow of fluid is returned to a reservoir tank and is therefore available for controlling the operating pressure of the fluid supplied to the vehicle steering system at the beginning of a steering maneuver. The other branch conduit from the pump bypasses the flow divider and is directly connected to the steering control valve. However, flow through the other branch conduit is blocked in the neutral position of the steering control valve which is so constructed that operating pressure for the steering system is regulated in response to adjustment of the steering control valve while the pilot flow fluid is conducted thereto. Branching of the output of the pump upstream of the flow divider thereby ensures that the fluid power cylinder of the steering system will receive that portion of the available flow necessary to meet the steering load demand.

In the foregoing type of interrelated steering and hydraulic working systems, the steering control valve must either be adjusted to a higher pressure in accordance with pressure conditions in the hydraulic working circuit or adjusted downwardly an initially higher pressure. The presence of a high pressure in the hydraulic working system is disadvantageous because such pressure must be reduced for maximum piston travel under control of the steering valve requiring a special valve surface configuration which differs from the optimum configuration otherwise dictated by the magnitude of the pressure in the hydraulic working system relative to the pressure in the steering system. Another disadvantage resides in the loading of the other structural components of the steering system by the possibly higher pressure of the hydraulic working system. Also, for the same steering resistance, the actuating force required on the steering wheel differs in dependence on the pressure level at which the hydraulic working system is operating at any instant.

It is therefore an important object of the present invention to provide a control system of the foregoing type which avoids loading of the steering system by the higher pressure of another hydraulic working system supplied with pressurized fluid from the same pump.

SUMMARY OF THE INVENTION

According to the present invention, a pressure regulating valve is incorporated into the control system between the branch conduit extending from the pump directly to the steering control valve, and the pilot flow conduit extending to the steering control valve from a flow divider in one embodiment. The regulating valve therefore acts as a piston manometer controlled by the control pressure of fluid in the pilot flow conduit and by the operating pressure in a branch conduit section extending to the steering control valve. Automatic differential pressure adjustment of the regulating valve thus meets the loading demands of the steering system. A check valve in the pressure regulating valve according to one embodiment of the invention, establishes fluid communication in one direction between the branch conduit section and the pilot flow conduit to prevent a reduction in pressure because of fluid leakage under a high operating pressure in the hydraulic working system. The foregoing arrangement enables the establishment of different maximum static pressures for the steering and the other hydraulic working system.

BRIEF DESCRIPTION OF DRAWING FIGURES

The invention will now be described in greater detail with reference to the embodiments thereof illustrated in the drawings, wherein:

FIG. 1 is a fluid circuit diagram of a control system in accordance with one embodiment of the invention interrelating a hydrostatic steering system and a hydraulic working system, FIG. 2 is a longitudinal section view through the pressure regulating valve as schematically shown in FIG. 1, FIG. 3 is a fluid circuit diagram of another embodiment of the invention, FIG. 4 is a longitudinal section view through the pressure regulating valve as diagrammed in FIG. 3, and FIG. 5 is a fluid circuit diagram similar to that of FIG. 1 but showing a modification in accordance with yet another embodiment of the invention.

DETAILED DESCRIPTION OF PREFERRED EMBODIMENTS

Figures 1, 2:
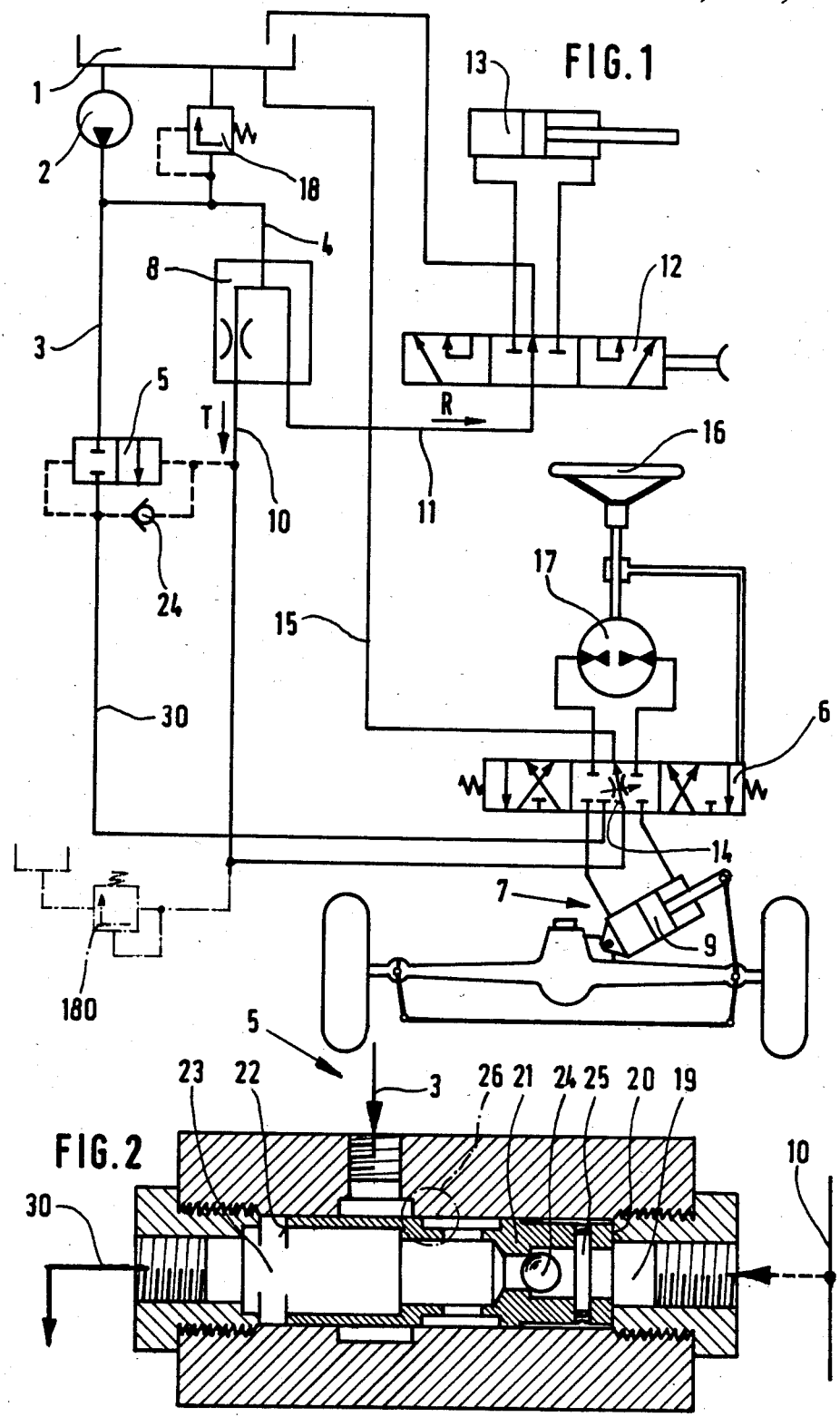

Referring now to the drawings in detail, FIG. 1 illustrates a control system having a fluid reservoir tank 1 from which pressure fluid is withdrawn by a pressure pump 2. The pressurized fluid output of the pump is divided downstream thereof between two branch conduits 3 and 4. The branch conduit 3 conducts pressurized fluid through a pressure regulating valve 5 to a conduit section 30, the operation of which will be described in greater detail hereinafter. Conduit section 30 conducts the fluid to a steering control valve 6. A first fluid power cylinder 7 is associated with a steering system through an operating circuit and has an operating piston 9, the movement of which is controlled through the steering control valve 6.

The branch conduit 4 is connected to a commercially available type of flow divider 8 through which pump pressurized fluid is diverted into a pilot flow conduit 10 undergoing a substantially constant pilot flow T, while a corresponding residual flow R is conducted in conduit 11. The fluid undergoing residual flow R in conduit 11 is fed to a control valve 12 through which operation of a second fluid power cylinder 13 is controlled. The fluid power cylinder 13 may be associated, for example, with a hydraulic lifting system. In the neutral position of control valve 12 shown in FIG. 1, the fluid undergoing residual flow R is returned to the reservoir tank 1. Other details of structural arrangement and operation of the hydraulic circuit associated with the control valve 12 and power cylinder 13 are not necessary for an understanding of the present invention, except that the power cylinder 13 is dimensioned so that full residual flow R to the control valve 12 is sufficient to handle maximum operational demands of the system being serviced.

In the illustrated neutral position of the steering control valve 6, the fluid undergoing pilot flow T in conduit 10 is returned to the reservoir tank 1 through a restricted valve passage 14 and return line 15. A metering pump 17 and the first fluid power cylinder 7 are connected in a manner well known in the art to the steering control valve 6 for manual adjustments through the hand steering wheel 16. The metering pump 17 is thus directly connected to the steering wheel 16 for synchronizing its movement with the piston 9 of the fluid power cylinder 7. A relief valve 18 is connected between branch conduit 4 and reservoir tank 1 to limit the operating pressure in the whole system to a maximum value provided the maximum static pressures in the steering and hydraulic operating circuits are identical.

Except for incorporating of the pressure regulating valve 5 between branch conduit 3 and pilot flow conduit 10, the control system as hereinbefore described is generally known. FIG. 2 shows in greater detail the regulating valve 5 including a chamber 19 formed in the valve housing at one axial end connected to pilot flow conduit 10. An axial end face 20 of a valve piston 21 is exposed to the fluid in chamber 19 while the other axial end face 22 of piston 21 is exposed to fluid in another chamber 23 formed in the valve housing at the other axial end connected to the conduit section 30 extending to the steering control valve 6. A check valve 24 (shown diagrammatically in FIG. 1) blocks flow in one direction through a bore in the valve piston 21 extending between chamber 19 and chamber 23. In the open position, check valve 24 abuts a stop 25 disposed in the bore of the piston 21 through which fluid is conducted to the chamber 18 from chamber 23. A control edge 26 on the valve piston 21 regulates the pressure of the fluid conducted in conduit 30 to the steering control valve 6 to the level of pressure in the pilot flow conduit 10 independently of flow through the bore of the valve piston 21, when such pilot flow pressure is lower than the pump pressure in the branch conduit 3.

When the steering control valve 6 is displaced from the neutral position, shown in FIG. 1, in a right hand direction for example, the pilot flow rate is reduced by the restriction in valve passage 14 adjustable to produce an increasing pressure in the pilot flow conduit 10. Since such increasing pressure acts on face 20 of the valve piston 21 in opposition to the operating pressure in branch conduit 3 acting on face 22, both pressures are equalized in level by the action of the regulating valve 5. Accordingly, control edge 26 is always opened during steering movement by an amount corresponding to the particular reception of flow in the power cylinder under a given load. With the steering control valve 6 displaced in the right hand direction as aforementioned, operating fluid is conducted by conduits 3 and 30 through the metering pump 17 to the left hand chamber of cylinder 7 causing displacement of piston 9 in a right hand direction. The fluid displaced from the right hand chamber of cylinder 7, is conducted by line 15 to tank 1. The check valve 24 prevents a pressure build up in conduit section 30 and at steering valve 6 in the neutral position caused by leakage in the regulating valve with the control edge passage 26 closed.

In addition to relief valve 18, another relief valve 180 is connected to the pilot flow conduit 10 to limit pressure therein if the maximum static pressure in the steering system is lower than that in the hydraulic working system with which cylinder 13 is associated. On the other hand, if the maximum static pressure of the hydraulic working system is lower, an additional relief valve (not shown) must be connected to conduit 11.

Figure 3:
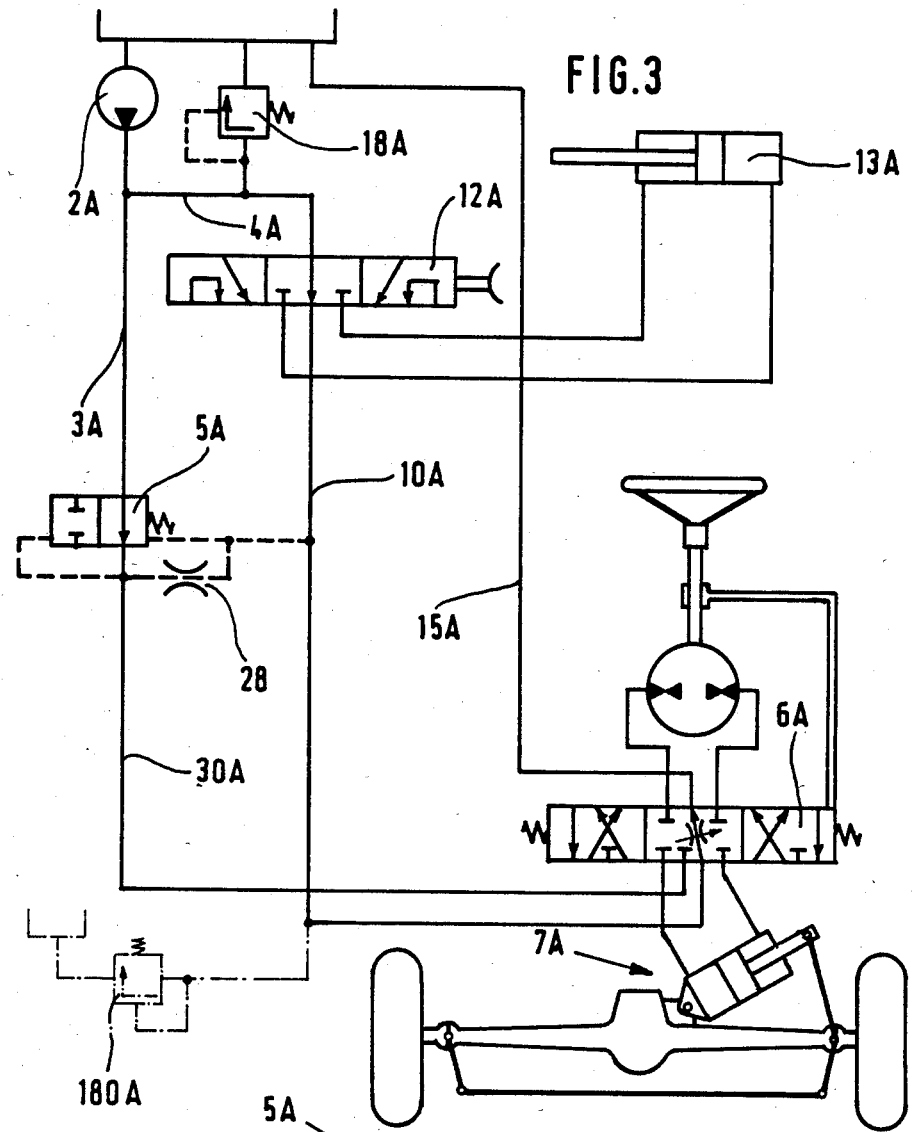
Figure 4:
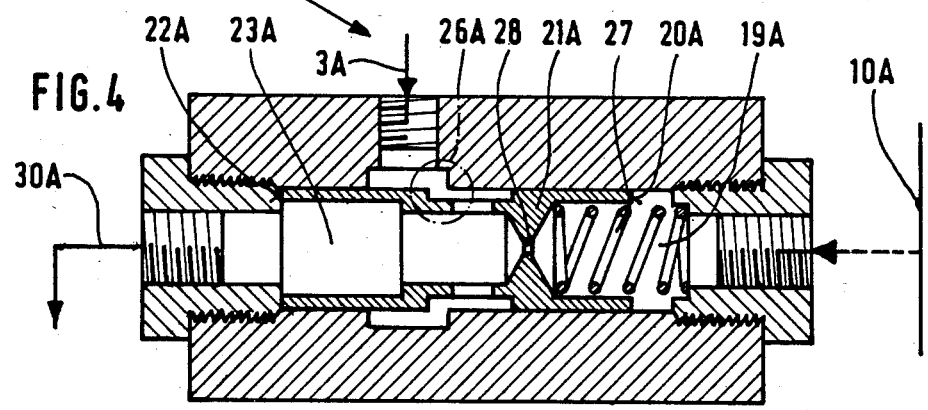

FIG. 3 shows a control system in which idling flow from the pump 2A is recirculated sequentially through the control valve 12 for the cylinder 13A of the hydraulic working system and the steering control valve 6A in the neutral position. The pilot flow conduit 10A forms an extension of branch conduit 4A through the control valve 12A for the second power cylinder 13A. As in the case of FIG. 1, operation of the steering system through servomotor 7A is given priority through branch conduit 3A over the second power cylinder. Below the maximum static pressure of pump 2A determined by relief valve 18A, pressure regulating valve 5A is operable as described with respect to FIGS. 1 and 2 to adjust the pressure of the fluid supplied to steering control valve 6A. When the maximum static pressure is reached, no pressurized fluid is conducted through control valve 12A and pilot flow conduit 10A to the steering control valve 6A so that pressure control is no longer possible. Nevertheless, by suitable modification of the regulating valve 5A incorporated between the branch conduit 3A and the pilot flow conduit 10A, a pilot flow for regulating pressure in the steering system is assured. For this reason, a spring 27 to bias valve piston 21A in a valve opening direction and a flow restrictor 28 in the bore of the valve piston are provided as shown in FIG. 4. The spring-loaded valve piston 21A is accordingly controlled by the differential pressure on opposite sides of the flow restrictor 28. The location of flow restrictor 28 downstream of the control edge passage 26A on the valve piston insures minimum fluid flow for pressure control of the steering system and also isolates the steering valve 6A for the high pressure of the other hydraulic working system.

In the neutral position of the control valve 12A as shown in FIG. 3, the idling flow of pump 2A is recirculated through pilot flow conduit 10A and the steering valve 6A to the tank through return line 15A. Since there is no pressure build up in branch conduit 3A, the pressure regulating valve 5A is opened by the bias of spring 27. When the control valve 12A is displaced, for example, in a left hand direction, the right hand pressure chamber of power cylinder 13A is expanded by pressurized fluid while the fluid in the left hand chamber is displaced through valve 12A and conduit 10A into the tank as aforementioned. The fluid in branch conduit 3A will then be at the pressure in the hydraulic working system so as to close the control edge valve passage 26A in the regulating valve 5A and prevent it from being applied to the steering valve 6A. When the steering valve 6A is displaced in response to movement of the steering wheel, the control pressure in pilot flow conduit 10A is adjusted resulting in displacement of valve piston 21A to an opened position of the regulating valve 5A. The control pressure in conduit 10A and the bias of spring 27 opposing the operating pressure in conduit section 30A, influences displacement of the valve piston 21A to adjust the operating pressure applied through adjusted steering valve 6A to one of the pressure chambers of the power cylinder 7A.

If relief valve 18A is opened in response to overloading of the power cylinder 13A, flow in pilot flow conduit 10A through control valve 12A is interrupted. In such case, pilot flow through branch conduit 3A and flow restrictor 28 is maintained. If the maximum static pressures in the hydraulic working and steering systems are identical, the relief valve 18A may serve the entire system. On the other hand, if the maximum static pressure of the steering system is lower, a lower pressure limit for pilot flow conduit 10A is established by an additional relief valve 180A.

Figure 5:
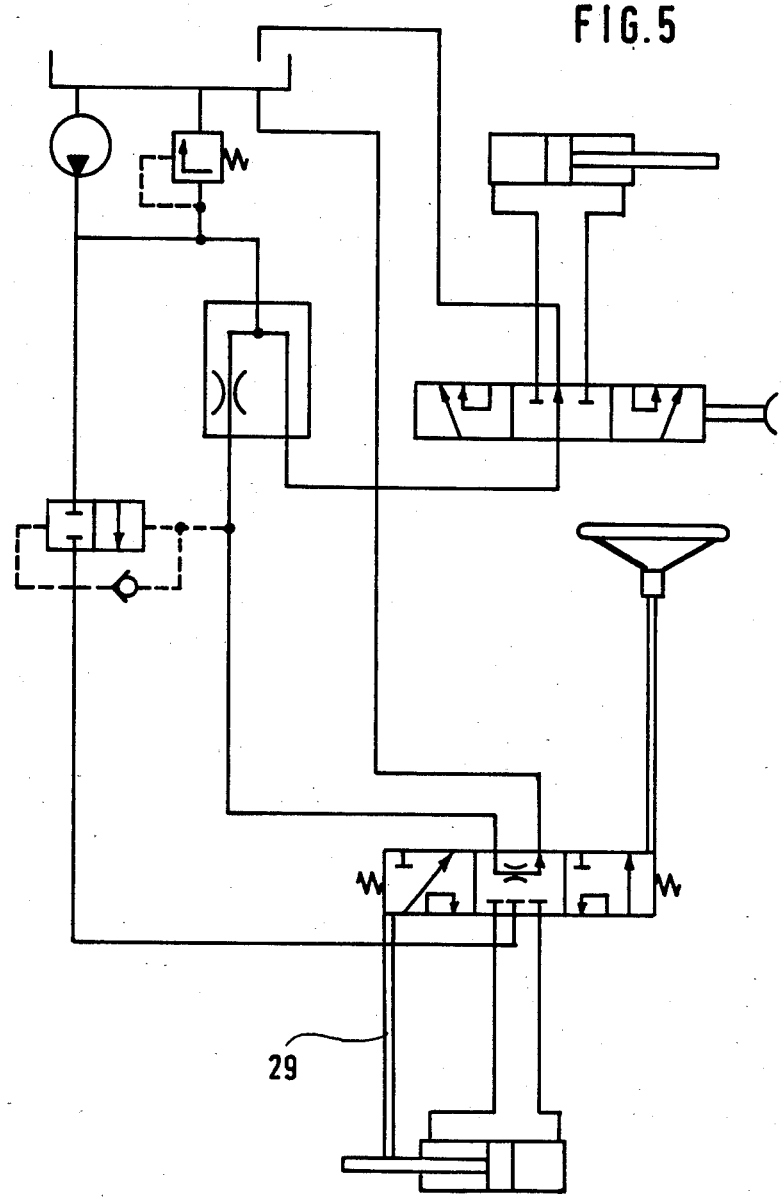

FIG. 5 illustrates an arrangement similar to FIG. 1 except for the steering system being serviced, which includes a mechanical steering transmission and steering linkage 29 between the hand steering wheel and the vehicle wheels to be steered.

What is claimed is:

1. In a control arrangement for at least two power operated systems, each having a pressure operating device and a control valve through which operating fluid is supplied to the operating device, one of said systems being of the vehicle steering type, including a common pressure pump from which pressurized fluid is supplied to the control valves of both of said systems, separate branch conduits connected to the pump through which said pressurized fluid is supplied to the operating devices, one of the branch conduits being directly connected to one of the control valves associated with said one of the systems, flow divider means connecting the other of the branch conduits to the other of the control valves for supply thereto of fluid under residual flow, pilot flow means connecting the flow divider means to said one of the control valves for controlling the supply of the operating fluid to the pressure operating device of said one of the systems, a fluid reservoir from which the pump draws the fluid, said one of the control valves being displaceable from a neutral position in which flow of the operating fluid is blocked and fluid communication established between the pilot flow means and the fluid reservoir, to an operative position in which flow through the pilot flow means is blocked and the pressurized fluid in said one of the branch conduits conducted to the operating device of said one of the systems is accordingly reduced in pressure, the improvement comprising pressure regulating valve means (5) connected between said one of the branch conduits (3) and the pilot flow means (10) for regulating the pressure of the operating fluid supplied to said one of the systems in response to a pressure differential between said one of the branch conduits and the pilot flow means, said regulating valve means including a housing enclosing a pair of chambers (19, 23) respectively connected to the pilot flow means (10) and a section (30) of said one of the branch conduits (3), and a valve piston (21) displaceable within the housing between said chambers having pressure faces (20, 22) respectively exposed to the fluid in said chambers, said valve piston (21) being provided with a bore through which fluid is conducted between said chambers, and check valve means (24) for limiting flow through the bore to one direction toward the pilot flow means (10).

2. In combination with at least two fluid operated systems, each having a control valve to which fluid under operating pressure is supplied from a common pump through separate branch conduits, and a pilot flow conduit conducting a portion of the fluid in one of the branch conduits to one of the control valves (6,6A) which is displaceable from a neutral position, the improvement comprising flow restrictor means (14) recirculating the fluid conducted through said one of the branch conduits (4, 4A) in the neutral position of the other of the control valves for conducting the fluid on a priority basis to said one of the control valves, and pressure regulating valve means (5, 5A) connected between the other of the branch conduits (3, 3A) and the pilot flow conduit (10, 10A) for blocking flow through the other of the branch conduits in the neutral position of said one of the control valves (6, 6A) and adjusting the operating pressure in one of the fluid operated systems, with which said one of the control valves is associated, in accordance with loading of said one of the systems, whereby said one of the fluid operating systems is isolated from a higher operating pressure in the other of the fluid power operating systems, said pressure regulating valve means including a housing enclosing a pair of pressure chambers (19, 23; 19A, 23A) respectively in fluid communication with the pilot flow conduit and the other of the branch conduits, and a valve piston (21, 21A) displaceable in said housing having pressure faces (20, 22; 20A, 22A) respectively exposed to fluid in said pressure chambers, a passage through which the fluid is conducted between the chambers, and check valve means (24) for directionally limiting flow of the fluid through the passage to the pilot flow conduit.

* * * * *